United States Patent
Huang

(10) Patent No.: US 6,557,788 B1
(45) Date of Patent: May 6, 2003

(54) HOSE CONNECTOR

(76) Inventor: Dustin Huang, No. 2, Yung-Feng Lane, Hsin Pao Village, Fang-Yuan Hsiang, Chang Hua Hsien (TW)

( * ) Notice: Subject to any disclaimer, the term of this patent is extended or adjusted under 35 U.S.C. 154(b) by 0 days.

(21) Appl. No.: 10/162,049

(22) Filed: Jun. 5, 2002

(51) Int. Cl.⁷ .............................. B05B 1/00; F16L 33/00; F16L 47/00
(52) U.S. Cl. ...................... 239/600; 239/589; 285/245; 285/246; 285/255
(58) Field of Search ................................. 239/589, 600; 285/255, 245, 246; D24/129; D23/262

(56) References Cited

U.S. PATENT DOCUMENTS

| | | | | |
|---|---|---|---|---|
| 4,278,279 A | * | 7/1981 | Zimmerman | 285/255 |
| 4,500,118 A | * | 2/1985 | Blenkush | 285/247 |
| 4,583,767 A | * | 4/1986 | Hansen | 285/245 |
| 4,749,217 A | * | 6/1988 | Causby et al. | 285/245 |
| 4,903,995 A | * | 2/1990 | Blenkush et al. | 285/255 |
| 6,231,085 B1 | * | 5/2001 | Olson | 285/255 |

* cited by examiner

*Primary Examiner*—Robin O. Evans
(74) *Attorney, Agent, or Firm*—Harrison & Egbert

(57) ABSTRACT

A hose connector includes a connection body and a lock ring. The connection body is provided at one end with a fastening portion engageable with a lawn sprinkler or the like, and at the other end with a tubular protrusion which is provided with an outer threaded portion, an annular groove, and a toothed edge. The lock ring is provided with an inner threaded portion, and a sloped portion located in the inner wall of the outer end thereof. The lock ring is joined with the tubular protrusion such that the inner threaded portion of the lock ring is engaged with the outer threaded portion of the tubular protrusion. The lock ring can be turned counterclockwise to move toward the fastening portion, or clockwise to move away from the fastening portion.

1 Claim, 5 Drawing Sheets

HOSE CONNECTOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a lawn sprinkler or the like, and more particularly to a hose connector of the lawn sprinkler or the like.

BACKGROUND OF THE INVENTION

The conventional hose connector comprises a connection body and a lock ring. The lock ring is provided with threads of clockwise rotation. The hose is connected to the connection body by the lock ring. The lock ring must be first separated from the connection body before the hose is connected to the connection body. Upon being connected to the connection body, the hose is then fastened by the lock ring. The chore of separating the lock ring from the connection body is time-consuming and annoying.

BRIEF SUMMARY OF THE INVENTION

The primary objective of the present invention is to provide a hose connector which is free of the shortcoming of the conventional hose connector described above.

The hose connector of the present invention comprises a connection body and a lock ring. The connection body has a tubular protrusion which is provided with outer threads of counter rotation. The lock ring is provided with inner threads of counter rotation, and a sloped surface contiguous to the inner threads. The lock ring is not separated from the connection body at the time when the hose is to be connected or disconnected with the connection body.

The features and the advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
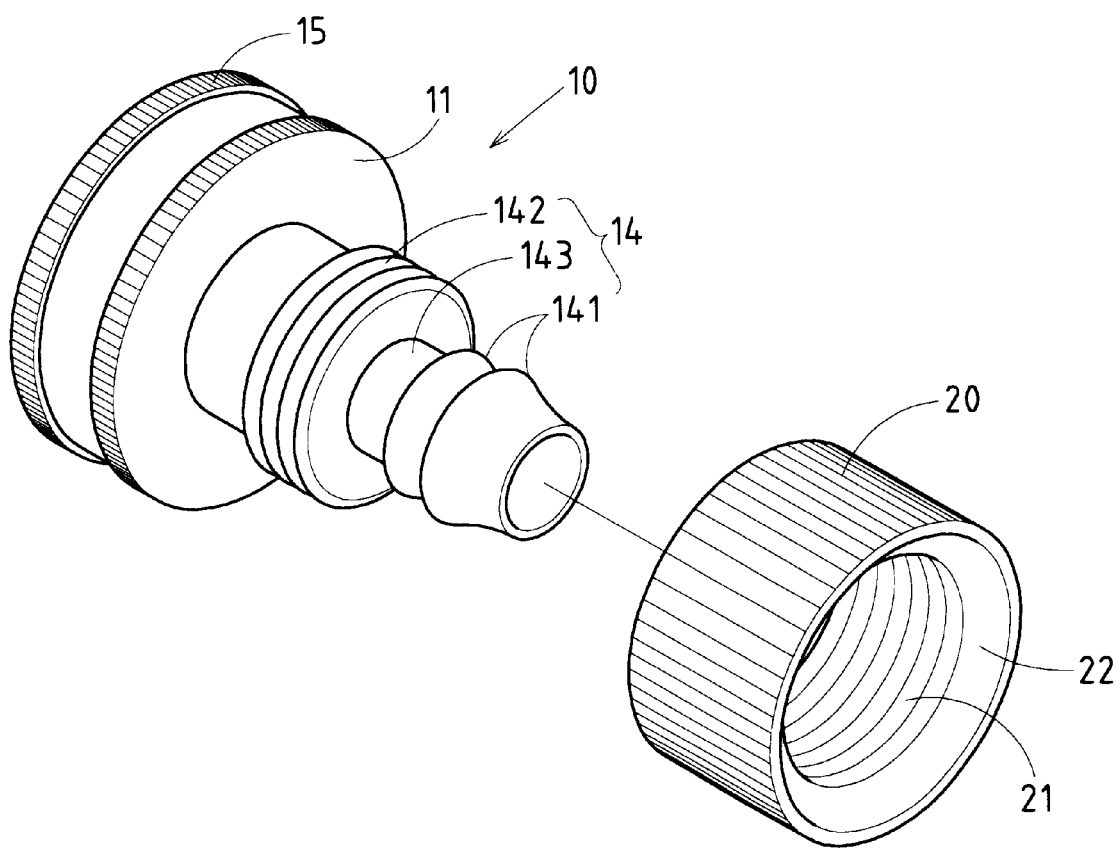
FIG. 1 shows an exploded perspective view of a first preferred embodiment of the present invention.

As shown in FIGS. 1–4, a hose connector embodied in the present invention comprises a connection body 10 and a lock ring 20.

The connection body 10 is provided at one end with a fastening portion 11 which is provided with inner threads 12 and a washer 13. The fastening portion 11 is used to fasten the hose connector to a lawn sprinkler of the like. The connection body 10 is provided at other end with a tubular protrusion 14 smaller in diameter than the fastening portion 11. The tubular protrusion 14 is provided at the free end with a toothed edge 141, and in the inner segment with an outer threaded portion 142 of counter rotation. Located between the toothed edge 141 and the outer threaded portion 142 is an annular groove 143.

The lock ring 20 is provided with inner threads 21 of counter rotation, and in the inner wall of the outer end thereof with a sloped portion 22 contiguous to the inner threads 21. The lock ring 20 is joined with the tubular protrusion 14 of the connection body 10 such that the inner threads 21 of the locking ring 20 are meshed with the outer threaded portion 142 of the tubular protrusion 14.

Figure 2:
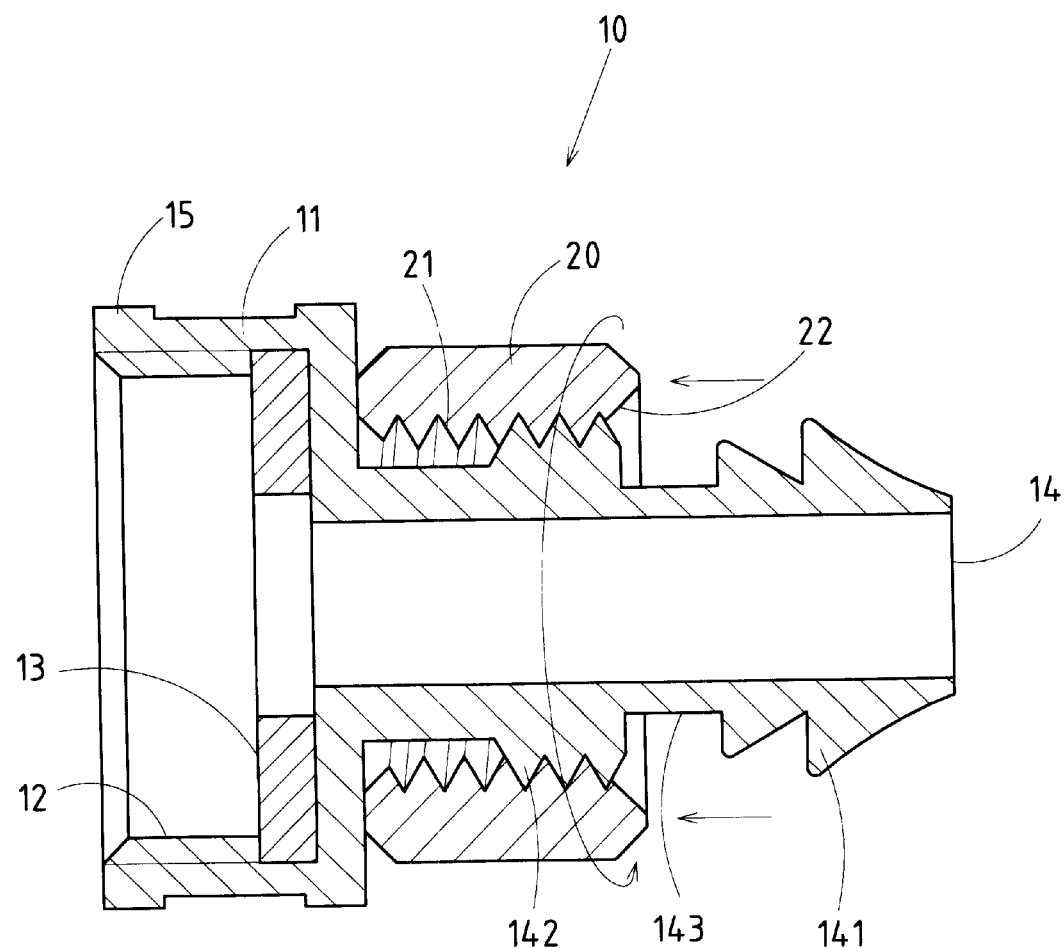
FIGS. 2–4 are sectional schematic views of the first preferred embodiment of the present invention in action.
Figure 3:
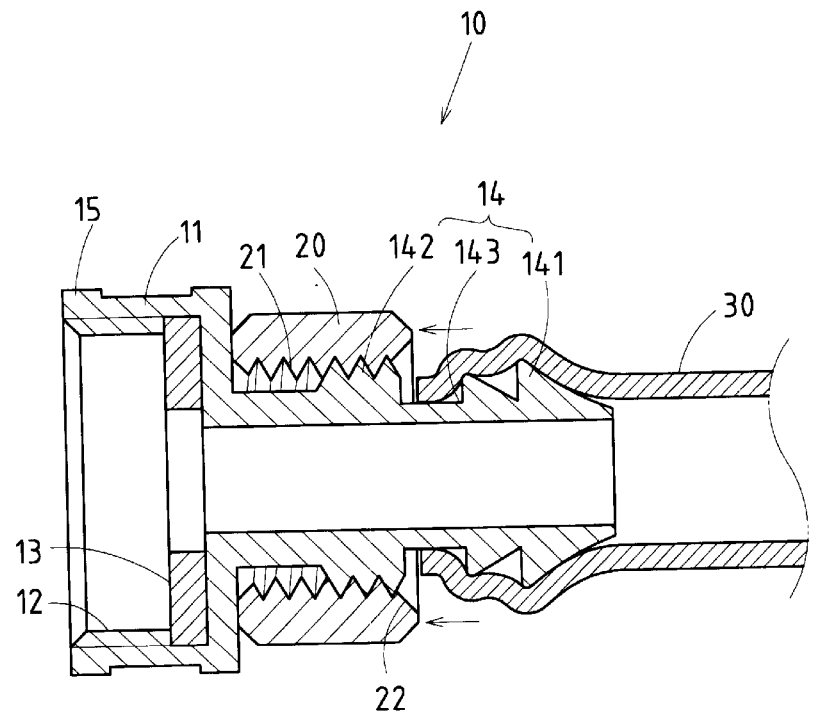
Figure 4:
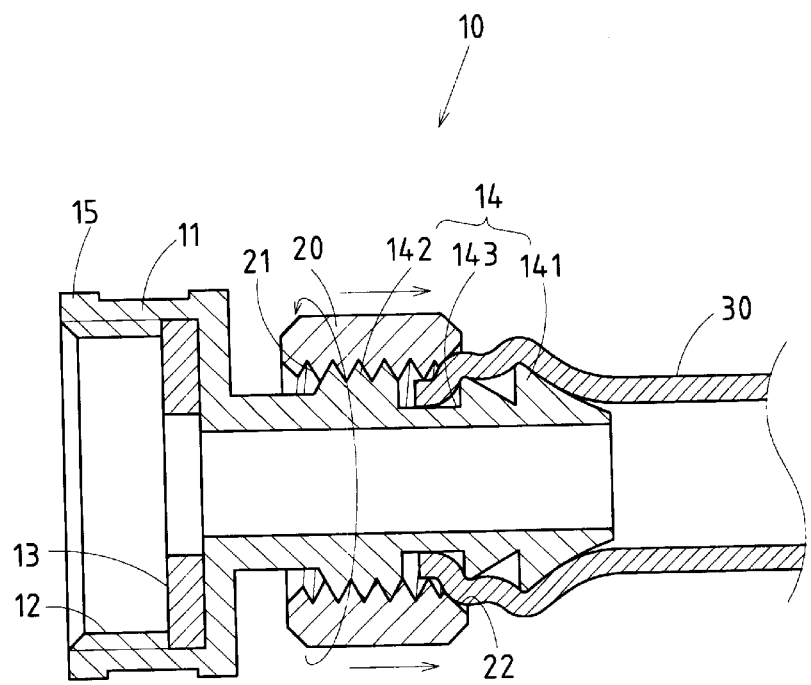

As illustrated in FIGS. 2–4, before a hose 30 is connected to the connection body 10, the lock ring 20 is first turned in counterclockwise direction such that the lock ring 20 is moved toward the fastening portion 11, as shown in FIG. 2. Thereafter, one end of the hose 30 is fitted over the toothed edge 141 of the free end of the tubular protrusion 14 such that the end of the hose 30 is located in the annular groove 143 of the tubular protrusion 14, as shown in FIG. 3. Finally, the lock ring 20 is turned clockwise to move in the direction away from the fastening portion 11 until such time when the sloped portion 22 of the outer end of the lock ring 20 comes in close contact with the outer wall of the end of the hose 30, as shown in FIG. 4.

The end of the hose 30 can be disconnected from the hose connector of the present invention by turning the lock ring 20 to move toward the fastening portion 11. The lock ring 20 is always joined with the connection body 10.

The fastening portion 11 of the connection body 10 is circular in shape and is provided in the outer wall of the inner end thereof with a skidproof portion 15, as shown in FIG. 11.

Figure 5:
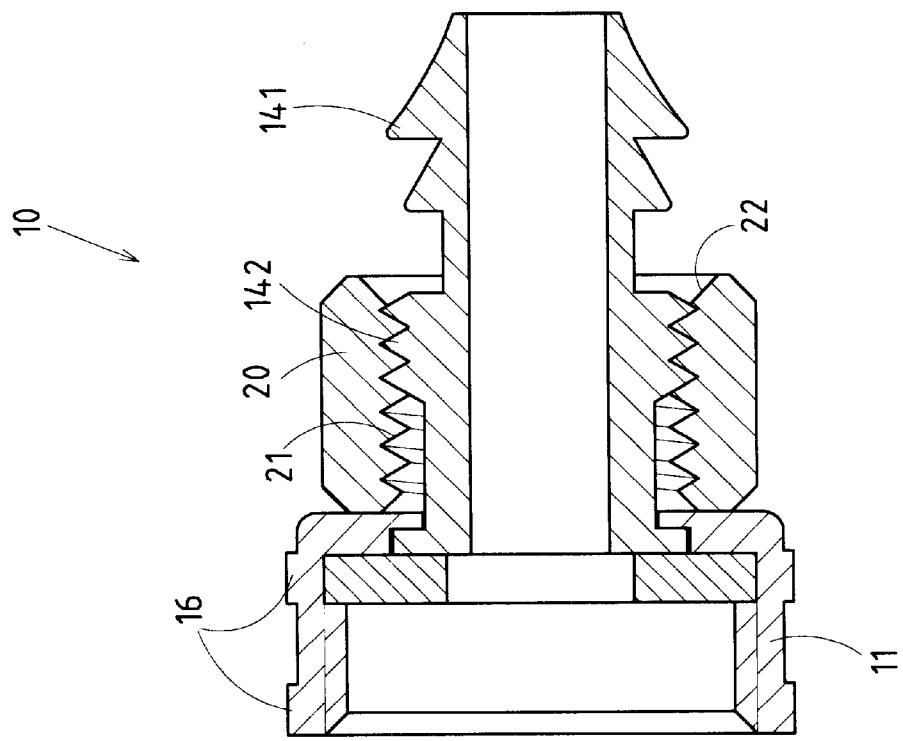
FIG. 5 shows a sectional schematic view of a second preferred embodiment of the present invention.
Figure 5:
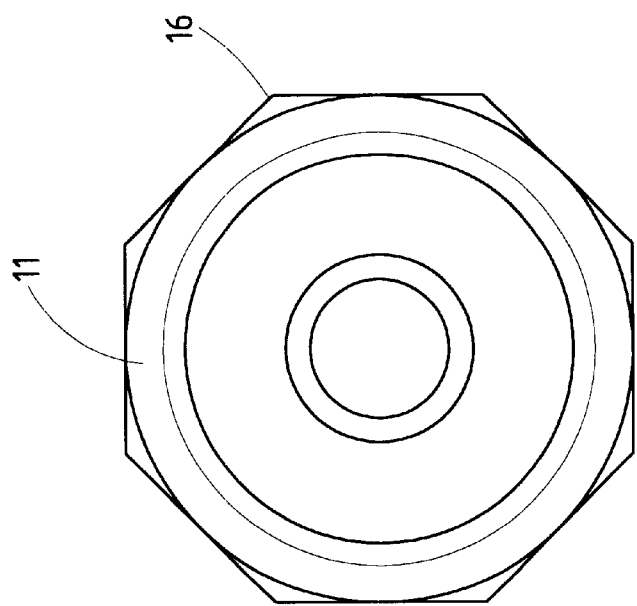

The fastening portion 11 of the connection body 10 is circular in shape and is provided in the outer wall of the inner end thereof with a plurality of ridges 16, as shown in FIG. 5.

Figure 6:
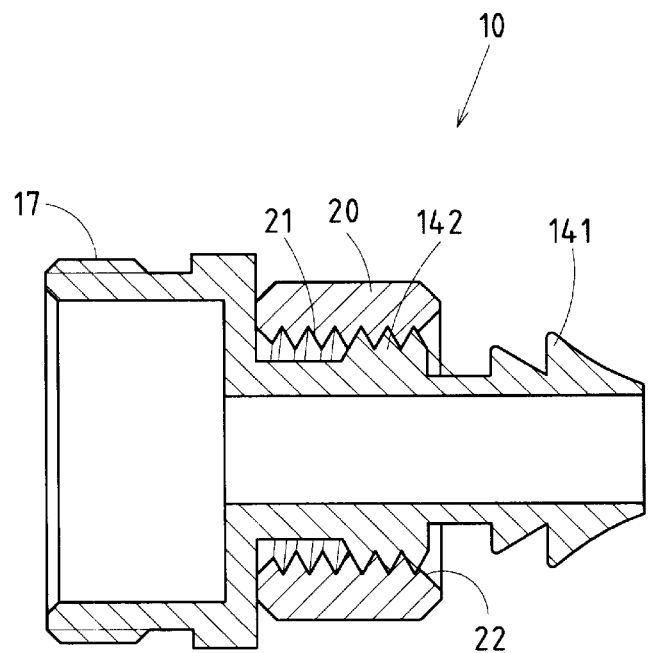
FIG. 6 shows a sectional schematic view of a third preferred embodiment of the present invention.

The fastening portion 11 of the connection body 10 may be provided at the inner end with an outer threaded portion 17, as shown in FIG. 6.

Figure 7:
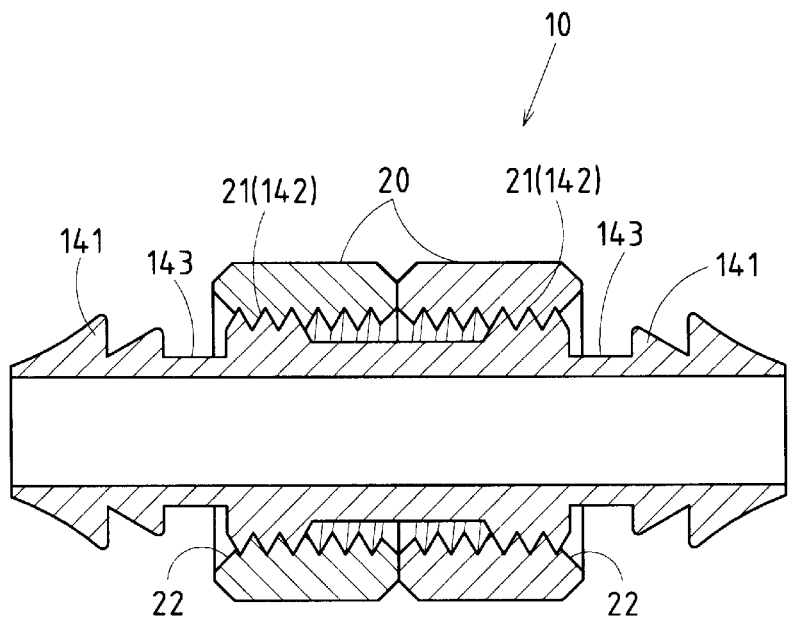
FIG. 7 shows a sectional schematic view of a fourth preferred embodiment of the present invention.

The hose connector of the present invention may be double-ended, as shown in FIG. 7. The double-ended hose connector of the present invention is designed to connect two hoses end to end.

I claim:

1. A hose connector comprising:

a connection body having a fastening means at one end, said fastening means for connection to a lawn sprinkler, said connection body having a tubular protrusion having a length and a diameter, said diameter of said tubular protrusion being smaller than a diameter of said fastening means, said tubular protrusion having an outer threaded portion contiguous with said fastening means and a toothed edge adjacent an end opposite said fastening means, said tubular protrusion having an annular groove formed between said outer threaded portion and said toothed edge, said outer threaded portion having threads of counter rotation; and a lock ring having inner threads of counter rotation formed in an inner wall thereof, said lock ring having an outer wall of generally constant diameter, said lock ring having a sloped portion formed at an end thereof opposite said fastening means, said sloped portion being unthreaded and widening in diameter from said inner threads toward the end opposite said fastening means, said inner threads of said lock ring meshing with said outer threads of said connection body such that said lock ring is rotatable counterclockwise so as to move toward said fastening means and rotatable clockwise to move away from said fastening means.

* * * * *